(12) United States Patent
Leppänen et al.

(10) Patent No.: US 10,768,711 B2
(45) Date of Patent: Sep. 8, 2020

(54) MEDIATED REALITY (71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 84 days.

(21) Appl. No.: 15/579,403

(22) PCT Filed: May 26, 2016

(86) PCT No.: PCT/FI2016/050366
§ 371 (c)(1),
(2) Date: Dec. 4, 2017

(87) PCT Pub. No.: WO2016/193537
PCT Pub. Date: Dec. 8, 2016

(65) Prior Publication Data
US 2018/0143694 A1 May 24, 2018

(30) Foreign Application Priority Data
Jun. 4, 2015 (EP) .................................... 15170628

(51) Int. Cl.
*G06F 3/01* (2006.01)
*G06T 19/20* (2011.01)
*G06F 3/0346* (2013.01)

(52) U.S. Cl.
CPC ............. *G06F 3/017* (2013.01); *G06F 3/011* (2013.01); *G06F 3/0346* (2013.01); *G06T 19/20* (2013.01)

(58) Field of Classification Search
CPC ........ G06F 3/017; G06F 3/011; G06F 3/0346; G06T 19/20; G02B 27/017
See application file for complete search history.

(56) References Cited

U.S. PATENT DOCUMENTS 9,076,033 B1 * 7/2015 Barron ............... G06K 9/00355
9,778,750 B2 * 10/2017 Kumar .................... G06F 3/017
(Continued)

FOREIGN PATENT DOCUMENTS

EP 3037917 A1 6/2016
EP 3101511 A1 12/2016
(Continued)

OTHER PUBLICATIONS

Office action received for corresponding Japanese Patent Application No. 2017-562760, dated Mar. 7, 2019, 5 pages of office action and 4 pages of office action translation available.
(Continued)

Primary Examiner — Lixi C Simpson
(74) Attorney, Agent, or Firm — Harrington & Smith (57) ABSTRACT A method comprising: enabling viewing by a user of a virtual scene of a virtual space; mapping a three-dimensional gesture of the user to a corresponding three-dimensional gesture in the virtual space; and in response to determining that the corresponding three-dimensional gesture in a virtual space is a first predetermined gesture or predetermined gestures in relation to a first portion of the virtual space, analyzing the virtual space over time to detect an event in the virtual space relating to the first portion of the virtual space.

20 Claims, 7 Drawing Sheets

(56) References Cited

U.S. PATENT DOCUMENTS

| | | | |
|---|---|---|---|
| 9,857,589 B2* | 1/2018 | Lundberg | G06K 9/48 |
| 2012/0086780 A1* | 4/2012 | Sharma | G06K 9/00771 |
| | | | 348/46 |
| 2014/0225918 A1* | 8/2014 | Mittal | G06F 3/017 |
| | | | 345/633 |
| 2015/0205484 A1* | 7/2015 | Morishita | G06F 3/012 |
| | | | 382/103 |

FOREIGN PATENT DOCUMENTS

| | | |
|---|---|---|
| EP | 3115870 A1 | 1/2017 |
| JP | 2014072570 A | 4/2014 |
| WO | 2001/090870 A1 | 11/2001 |
| WO | 2014/016987 A1 | 1/2014 |

OTHER PUBLICATIONS

"Dyadic Projected Spatial Augmented Reality", Youtube, Retrieved on Nov. 22, 2017, Webpage available at : https://www.youtube.com/watch?v=Df7fZAYVAIE.

"Frontier Vision—Augmented Reality with the Irrlicht Engine—Hand/Object Interaction", Youtube, Retrieved on Nov. 22, 2017, Webpage available at : https://www.youtube.com/watch?v=WcbTIVRaiY8.

"First Purported Virtual Reality Feature Film is an Oculus Rift Horror", Psfk, Retrieved on Nov. 22, 2017, Webpage available at : https://www.psfk.com/2014/10/oculus-rift-virtual-reality-horror-film.html.

"DreamWorks Reveals Glimpse of 360 Degree 'Super Cinema' Rendering for VR Films (video)", Road Tovr, Retrieved on Nov. 22, 2017, Webpage available at : https://www.roadtovr.com/dreamworks-reveals-video-360-degree-virtual-reality-super-cinema-format/.

Ardouin et al., "Stereoscopic Rendering of Virtual Environments With Wide Field-of-Views up to 360°", IEEE Virtual Reality (VR) Conference, Apr. 2014, 6 pages.

"Samsung Project Beyond Camera to Capture 360-Degree 3D Video for Gear VR Headset", CNET, Retrieved on Nov. 22, 2017, Webpage available at : https://www.cnet.com/news/samsung-project-beyond-camera-to-capture-360-degree-3d-video/.

Extended European Search Report received for corresponding European Patent Application No. 15170628.0, dated Dec. 16, 2015, 8 pages.

"Making Trigger Zones in Unity", Gardens and Machines, Retrieved on Nov. 22, 2017, Webpage available at : hittp://gardensandmachines.com/Gamedesign/03_TriggerTutorial_CB.pdf.

Hackenberg et al., "Lightweight Palm and Finger Tracking for Real-Time 3D Gesture Control", IEEE Virtual Reality Conference, Mar. 19-23, 2011, pp. 19-26.

International Search Report and Written Opinion received for corresponding Patent Cooperation Treaty Application No. PCT/FI2016/050366, dated Aug. 30, 2016, 13 pages.

Office action received for corresponding Japanese Patent Application No. 2017-562760, dated Jun. 20, 2019, 6 pages of office action and 4 pages of translation available.

* cited by examiner

MEDIATED REALITY

RELATED APPLICATION

This application was originally filed as Patent Cooperation Treaty Application No. PCT/FI2016/050366 filed May 26, 2016 which claims priority benefit to European Patent Application No. 15170628.0, filed Jun. 4, 2015.

TECHNOLOGICAL FIELD

Embodiments of the present invention relate to mediated reality for example augmented reality or virtual reality.

BACKGROUND

Mediated reality in this document refers to a user experiencing a fully or partially artificial environment. Augmented reality is a form of mediated reality in which a user experiences a partially artificial, partially real environment. Virtual reality is a form of mediated reality in which a user experiences a fully artificial environment.

BRIEF SUMMARY

According to various, but not necessarily all, embodiments of the invention there is provided a method comprising: enabling viewing by a user of a virtual scene of a virtual space; mapping a three-dimensional gesture of the user to a corresponding three-dimensional gesture in the virtual space; and in response to determining that the corresponding three-dimensional gesture in a virtual space is a first predetermined gesture or predetermined gestures in relation to a first portion of the virtual space, analyzing the virtual space over time to detect an event in the virtual space relating to the first portion of the virtual space.

According to various, but not necessarily all, embodiments of the invention there is provided an apparatus comprising: means for enabling viewing by a user of a virtual scene of a virtual space; means for mapping a three-dimensional gesture of the user to a corresponding three-dimensional gesture in the virtual space; and means for, in response to determining that the corresponding three-dimensional gesture in a virtual space is a first predetermined gesture or predetermined gestures in relation to a first portion of the virtual space, analyzing the virtual space over time to detect an event in the virtual space relating to the first portion of the virtual space.

According to various, but not necessarily all, embodiments of the invention there is provided a computer program which when run on a processor: enabling viewing by a user of a virtual scene of a virtual space; mapping a three-dimensional gesture of the user to a corresponding three-dimensional gesture in the virtual space; and in response to determining that the corresponding three-dimensional gesture in a virtual space is a first predetermined gesture or predetermined gestures in relation to a first portion of the virtual space, analyzing the virtual space over time to detect an event in the virtual space relating to the first portion of the virtual space.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate the same virtual space and different points of view and FIGS. 2A, 2B, 2C illustrate a virtual scene from the perspective of the respective points of view;

DETAILED DESCRIPTION

In the following description, apparatus and method will be described that allow a user 18 to control surveillance of a virtual space 20. The virtual space 20 in an augmented reality implementation, may be a remote or local real space, relative to the user 18, that is surveyed in real time. The virtual space 20 in a virtual reality implementation may be an entirely artificial virtual space or a recorded real space that does or does not comprise artificial virtual objects 28.

Definitions

"virtual space" refers to fully or partially artificial environment, which may be three dimensional.

"virtual scene" refers to a representation of the virtual space viewed from a particular point of view within the virtual space.

"real space" refers to a real environment, which may be three dimensional.

"real scene" refers to a representation of the real space viewed from a particular point of view within the real space.

"mediated reality" in this document refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user.

"augmented reality" in this document refers to a form of mediated reality in which a user visually experiences a partially artificial environment (a virtual space) as a virtual scene comprising a real scene of a physical real world environment (real space) supplemented by one or more visual elements displayed by an apparatus to a user;

"virtual reality" in this document refers to a form of mediated reality in which a user visually experiences a fully artificial environment (a virtual space) as a virtual scene displayed by an apparatus to a user;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"user interactive-mediated" as applied to mediated reality, augmented reality or virtual reality means that user actions at least partially determine what happens within the virtual space;

"displaying" means providing in a form that is perceived visually by the user.

DESCRIPTION

FIGS. 1A-1C and 2A-2C illustrate examples of mediated reality. The mediated reality may be augmented reality or virtual reality.

Figure 1A:
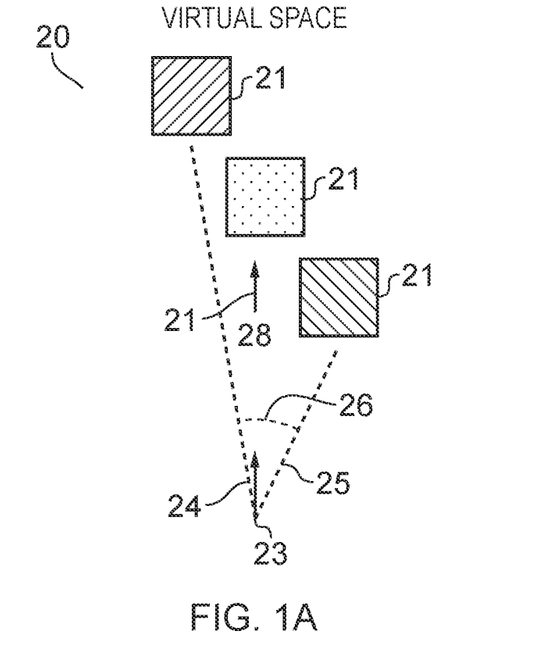
Figure 1B:
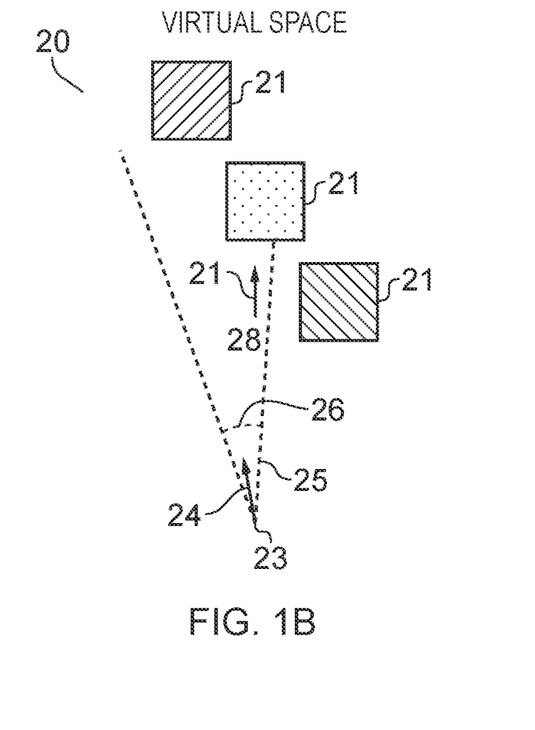
Figure 1C:
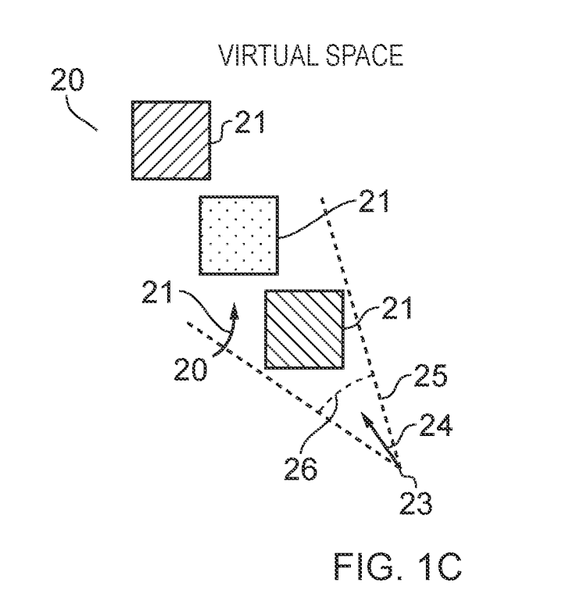

FIGS. 1A, 1B, 1C illustrate the same virtual space 20 comprising the same virtual objects 21, however, each Fig illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

Figure 2A:
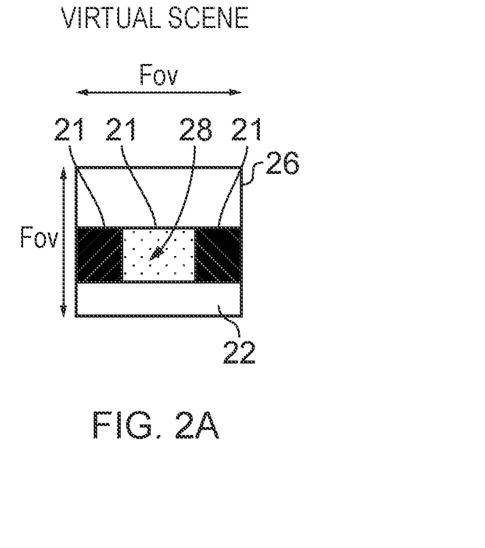
Figure 2B:
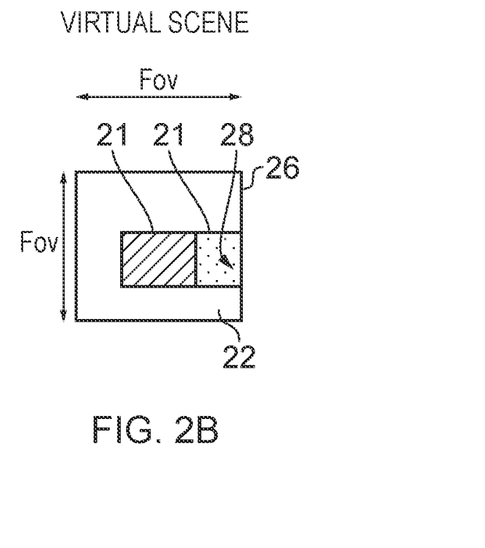
Figure 2C:
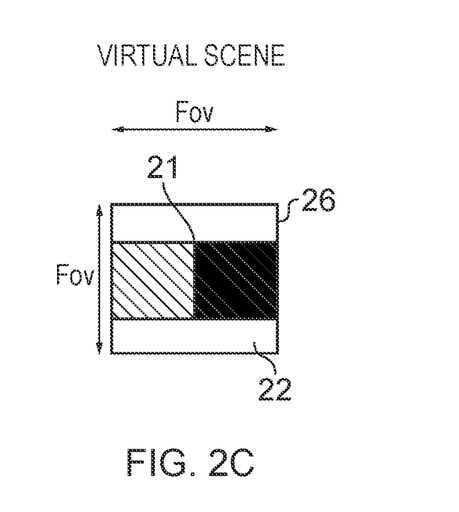

FIGS. 2A, 2B, 2C illustrate a virtual scene 22 from the perspective of the different points of view 24 of respective FIGS. 1A, 1B, 1C. The virtual scene 22 is determined by the point of view 24 within the virtual space 20 and a field of view 26. The virtual scene 22 is at least partially displayed to a user.

The virtual scenes 22 illustrated may be mediated reality scenes, virtual reality scenes or augmented reality scenes. A virtual reality scene displays a fully artificial virtual space 20. An augmented reality scene displays a partially artificial, partially real virtual space 20.

The mediated reality, augmented reality or virtual reality may be user interactive-mediated. In this case, user actions at least partially determine what happens within the virtual space 20. This may enable interaction with a virtual object 21 such as a visual element 28 within the virtual space 20.

The mediated reality, augmented reality or virtual reality may be perspective-mediated. In this case, user actions determine the point of view 24 within the virtual space 20, changing the virtual scene 22. For example, as illustrated in FIGS. 1A, 1B, 1C a position 23 of the point of view 24 within the virtual space 20 may be changed and/or a direction or orientation 25 of the point of view 24 within the virtual space 20 may be changed. If the virtual space 20 is three-dimensional, the position 23 of the point of view 24 has three degrees of freedom e.g. up/down, forward/back, left/right and the direction 25 of the point of view 24 within the virtual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

Figure 3A:
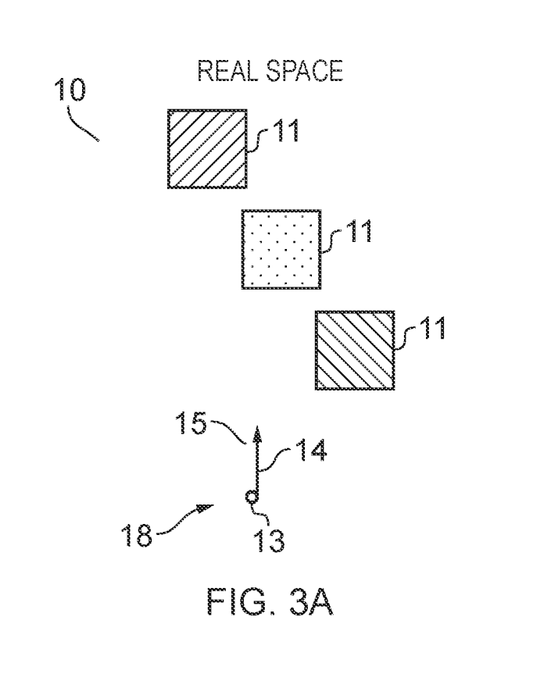
FIG. 3A illustrates an example of a real space and FIG. 3B illustrates an example of a real scene that partially corresponds with the virtual scene of FIG. 1B.

FIG. 3A illustrates a real space 10 comprising real objects 11 that partially corresponds with the virtual space 20 of FIG. 1A. In this example, each real object 11 in the real space 10 has a corresponding virtual object 21 in the virtual space 20, however, each virtual object 21 in the virtual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual space 20.

Figure 3B:
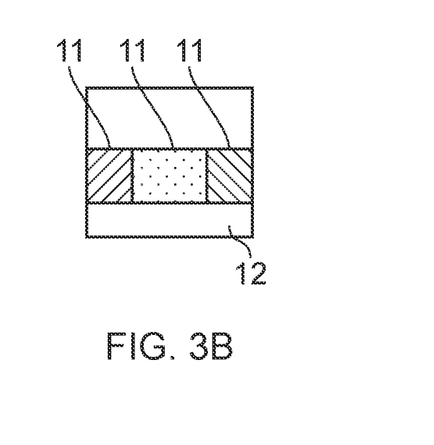

FIG. 3B illustrates a real scene 12 that partially corresponds with the virtual scene 22 of FIG. 1B, it includes real objects 11 but not artificial virtual objects. The real scene is from a perspective corresponding to the point of view 24 in the virtual space 20 of FIG. 1A. The real scene 12 content is determined by that corresponding point of view 24 and the field of view 26.

FIG. 2A may be an illustration of an augmented reality version of the real scene 12 illustrated in FIG. 3B. The virtual scene 22 comprises the real scene 12 of the real space 10 supplemented by one or more visual elements 28 displayed by an apparatus to a user. The visual elements 28 may be a computer-generated visual element. In a see-through arrangement, the virtual scene 22 comprises the actual real scene 12 which is seen through a display of the supplemental visual element(s) 28. In a see-video arrangement, the virtual scene 22 comprises a displayed real scene 12 and displayed supplemental visual element(s) 28. The displayed real scene 12 may be based on an image from a single point of view 24 or on multiple images from different points of view 24 at the same time, processed to generate an image from a single point of view 24.

Figure 4:
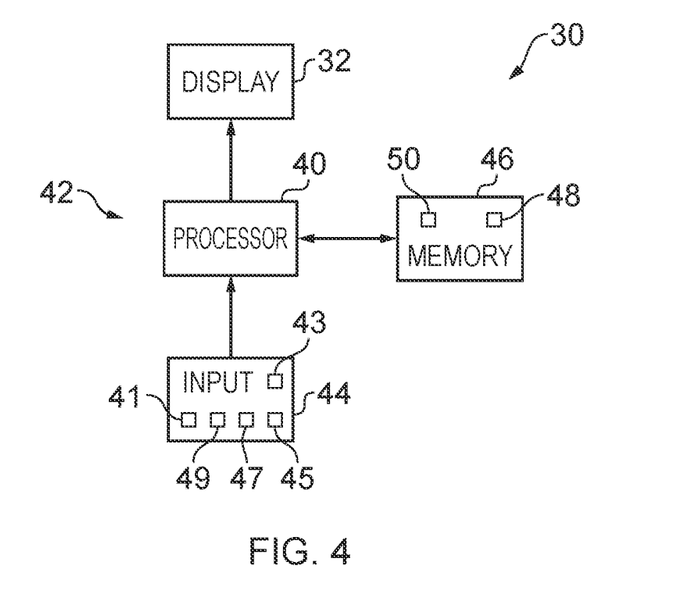
FIG. 4 illustrates an example of an apparatus that is operable to enable mediated reality and/or augmented reality and/or virtual reality.

FIG. 4 illustrates an example of an apparatus 30 that is operable to enable mediated reality and/or augmented reality and/or virtual reality.

The apparatus 30 comprises a display 32 for providing at least parts of the virtual scene 22 to a user in a form that is perceived visually by the user. The display 32 may be a visual display that provides light that displays at least parts of the virtual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5A & 5B and FIGS. 8 to 14. The processor 40 by reading the memory 46 is able to load and execute the computer program 48.

The apparatus 30 therefore comprises:
at least one processor 40; and
at least one memory 46 including computer program code 48 the at least one memory 46 and the computer program code 48 configured to, with the at least one processor 40, cause the apparatus 30 at least to perform:
  enabling viewing by a user 18 of a virtual scene 22 of a virtual space 20;
  mapping a three-dimensional gesture 80 of the user 18 to a corresponding three-dimensional gesture in the virtual space 20; and
  in response to determining that the corresponding three-dimensional gesture in a virtual space is a first predetermined gesture or predetermined gestures in relation to a first portion 120 of the virtual space 20, analyzing the virtual space 20 over time to detect an event 130 in the virtual space 20 relating to the first portion 120 of the virtual space 20.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 5A:
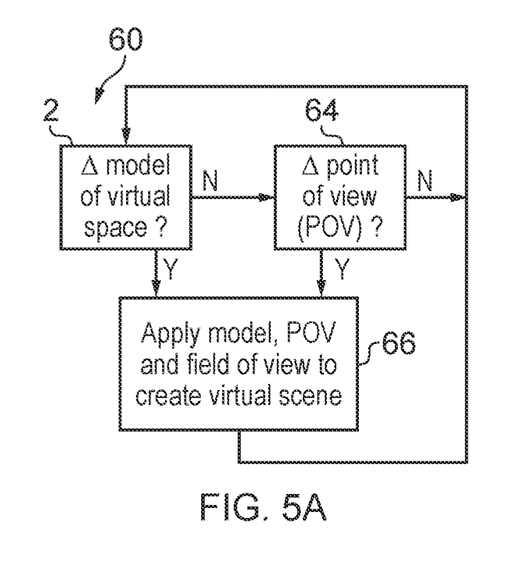
FIG. 5A illustrates an example of a method for enabling mediated reality and/or augmented reality and/or virtual reality.
Figure 5B:
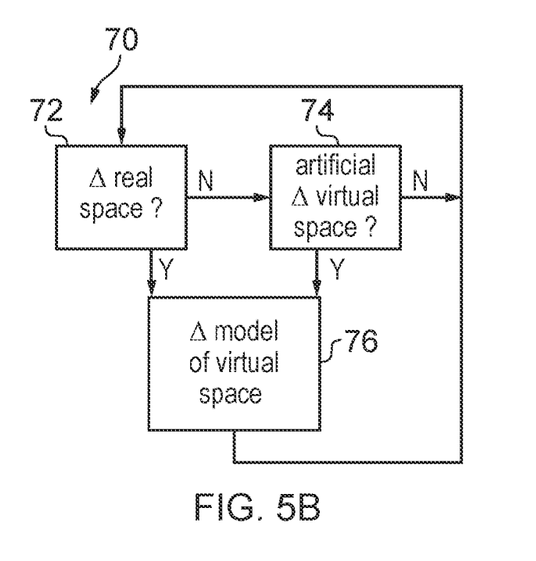
FIG. 5B illustrates an example of a method for updating a model of the virtual space for augmented reality.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The apparatus 30 may enable mediated reality and/or augmented reality and/or virtual reality, for example using the method 60 illustrated in FIG. 5A or a similar method. The controller 42 stores and maintains a model 50 of the virtual space 20. The model may be provided to the controller 42 or determined by the controller 42. For example, sensors in input circuitry 44 may be used to create overlapping depth maps of the virtual space from different points of view and a three dimensional model may then be produced.

At block 62 it is determined whether or not the model of the virtual space 20 has changed. If the model of the virtual space 20 has changed the method moves to block 66. If the model of the virtual space 20 has not changed the method moves to block 64.

At block 64 it is determined whether or not the point of view 24 in the virtual space 20 has changed. If the point of view 24 has changed the method moves to block 66. If the point of view 24 has not changed the method returns to block 62.

At block 66, a two-dimensional projection of the three-dimensional virtual space 20 is taken from the location 23 and in the direction 25 defined by the current point of view 24. The projection is then limited by the field of view 26 to produce the virtual scene 22. The method then returns to block 62.

Where the apparatus 30 enables augmented reality, the virtual space 20 comprises objects 11 from the real space 10 and also visual elements 28 not present in the real space 10. The combination of such visual elements 28 may be referred to as the artificial virtual space. FIG. 5B illustrates a method 70 for updating a model of the virtual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differentiating and may be achieved at an object level using computer vision to track objects as they move.

At block 74 it is determined whether or not the artificial virtual space has changed. If the artificial virtual space has changed the method moves to block 76. If the artificial virtual space has not changed the method returns to block 72. As the artificial virtual space is generated by the controller 42 changes to the visual elements 28 are easily detected.

At block 76, the model of the virtual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual space 20, changing the virtual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation.

The apparatus 30 may comprise as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
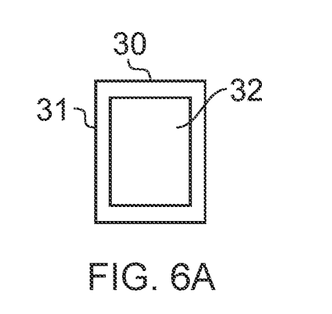
FIGS. 6A and 6B illustrate examples of apparatus that enable display of at least parts of the virtual scene to a user.
Figure 6B:
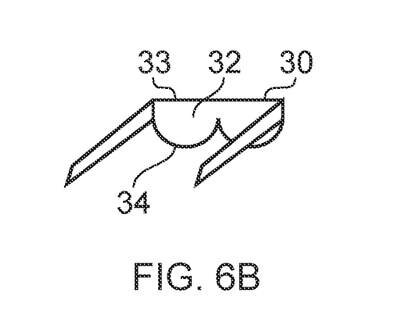

FIGS. 6A and 6B illustrate examples of apparatus 30 that enable display of at least parts of the virtual scene 22 to a user. Other examples of apparatus 30 that enable display of at least parts of the virtual scene 22 to a user may be used.

FIG. 6A illustrates a handheld apparatus 31 comprising a display screen as display 32 that displays images to a user and is used for displaying the virtual scene 22 to the user. The apparatus 30 may be moved deliberately in the hands of a user in one or more of the previously mentioned six degrees of freedom.

The handheld apparatus 31 may be or may be operated as a see-video arrangement for augmented reality that enables a live or recorded video of a real scene 12 to be displayed on the display 32 for viewing by the user while one or more visual elements 28 are simultaneously displayed on the display 32 for viewing by the user. The combination of the displayed real scene 12 and displayed one or more visual elements 28 provides the virtual scene 22 to the user.

If the handheld apparatus 31 has a camera mounted on a face opposite the display 32, it may be operated as a see-video arrangement that enables a live real scene 12 to be viewed while one or more visual elements 28 are displayed to the user to provide in combination the virtual scene 22.

FIG. 6B illustrates a head-mounted apparatus 33 comprising a display 32 that displays images to a user. The head-mounted apparatus 33 may be moved automatically when a head of the user moves.

The head-mounted apparatus 33 may be a see-through arrangement for augmented reality that enables a live real scene 12 to be viewed while one or more visual elements 28 are displayed by the display 32 to the user to provide in combination the virtual scene 22. In this case a visor 34, if present, is transparent or semi-transparent so that the live real scene 12 can be viewed through the visor 34.

The head-mounted apparatus 33 may be operated as a see-video arrangement for augmented reality that enables a live or recorded video of a real scene 12 to be displayed by the display 32 for viewing by the user while one or more visual elements 28 are simultaneously displayed by the display 32 for viewing by the user. The combination of the displayed real scene 12 and displayed one or more visual elements 28 provides the virtual scene 22 to the user. In this case a visor 34 is opaque and may be used as display 32.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body.

The tracking of one or more objects and/or points in relation to a user's body may be used by the apparatus 30 in gesture recognition and so on.

Figure 7A:
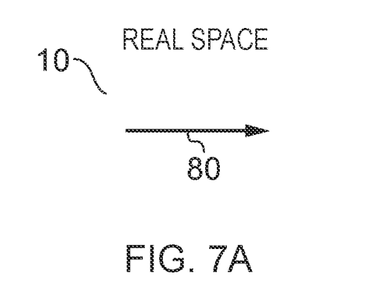
FIG. 7A illustrates an example of a gesture in a real space and FIG. 7B illustrates a corresponding representation of the gesture rendered in the virtual scene.

Referring to FIG. 7A, a particular gesture 80 in the real space 10 is a gesture user input used as a 'user control' event by the controller 42 to determine what happens within the virtual space 20. A gesture user input is a gesture 80 that has meaning to the apparatus 30 as a user input.

Figure 7B:
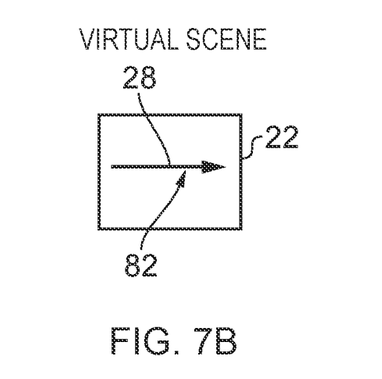

Referring to FIG. 7B, illustrates that in some but not necessarily all examples, a corresponding representation of the gesture 80 in real space is rendered in the virtual scene 22 by the apparatus 30. The representation involves one or more visual elements 28 moving 82 to replicate or indicate the gesture 80 in the virtual scene 22.

A gesture 80 may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A gesture 80 may be a non-contact gesture. A non-contact gesture does not contact the sensors at any time during the gesture.

A gesture 80 may be an absolute gesture that is defined in terms of an absolute displacement from the sensors. Such a gesture may be tethered, in that it is performed at a precise location in the real space 10. Alternatively a gesture 80 may be a relative gesture that is defined in terms of relative displacement during the gesture. Such a gesture may be un-tethered, in that it need not be performed at a precise location relative in the real space 10 and may be performed at a large number of arbitrary locations.

A gesture 80 may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$.

A gesture 80 may be performed in one spatial dimension (1D gesture), two spatial dimensions (2D gesture) or three spatial dimensions (3D gesture).

Figure 8:
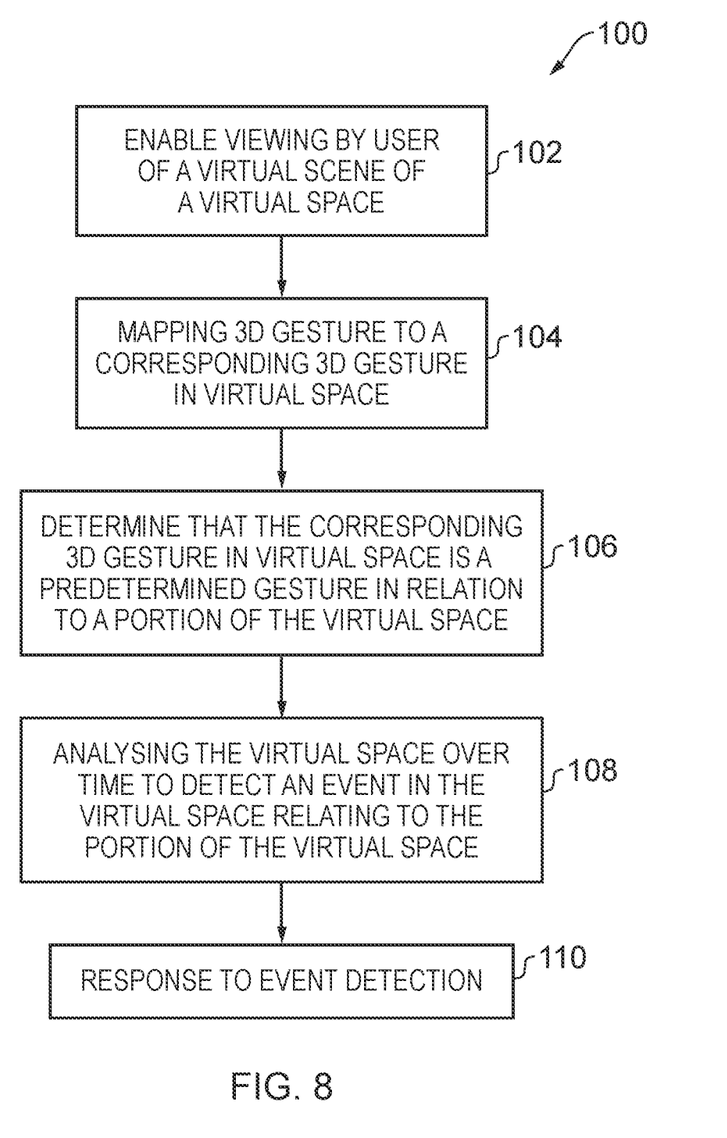
FIG. 8 illustrates a method, for enabling user control of event detection in a virtual space.

FIG. 8 illustrates a method 100, for enabling user control of event detection in a virtual space.

The method comprises: at block 102, enabling viewing by a user 18 of a virtual scene 22 of a virtual space 20; at block 104, mapping a three-dimensional gesture 80 of the user 18 to a corresponding three-dimensional gesture in the virtual space 20; at block 106, determining if the corresponding three-dimensional gesture in the virtual space is a first predetermined gesture or predetermined gestures in relation to a first portion 120 of the virtual space 20; if it is determined that the corresponding three-dimensional gesture in the virtual space is a first predetermined gesture or predetermined gestures in relation to the first portion 120 of the virtual space 20, then in response, at block 108, the method 100 analyzes the virtual space 20 over time to detect an event 130 in the virtual space 20 relating to the first portion 120 of the virtual space 20.

At block 110, the method 100 produces a response 122 to the event 130 detection.

Figures 12A, 12B:
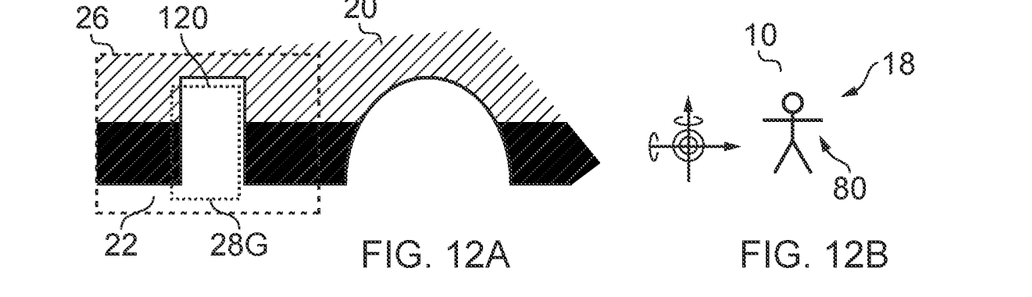
Figure 13A:
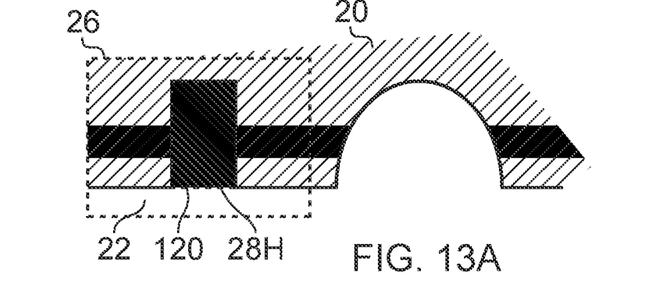
Figure 13B:
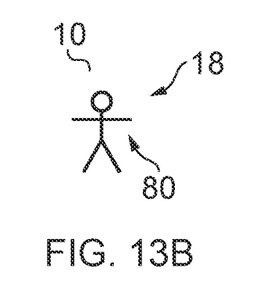
Figure 14A:
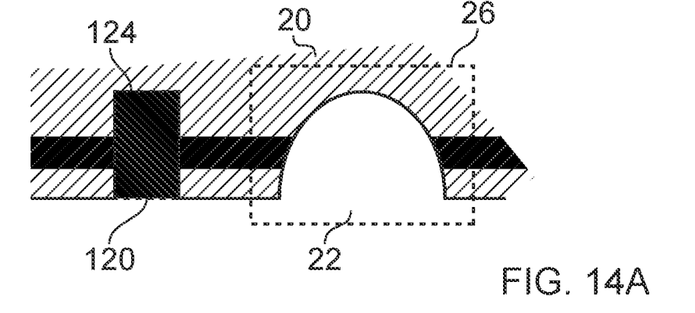
FIGS. 14A, 14B, 14C illustrate an example of detecting an event in the virtual space relating to the first portion of the virtual space.
Figure 14B:
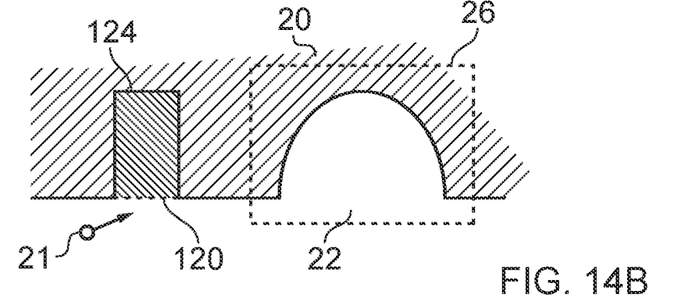
Figure 14C:
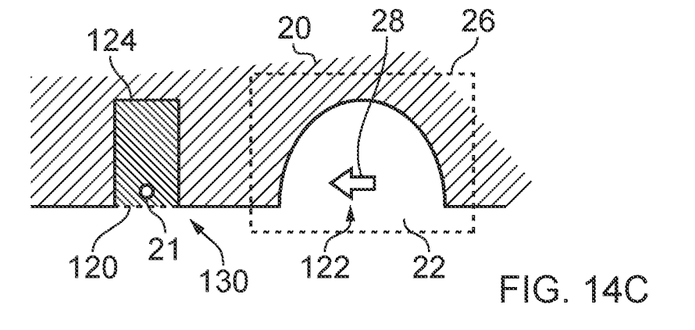

This method can be understood in relation to the example illustrated in FIGS. 9A, 9B, 10A, 10B, 11A, 11B, 12A, 12B and 13A, 13B which illustrate an example of user-specification of a first portion 120 of the virtual space 20 and in relation to the example illustrated in FIGS. 14A, 14B, 14C which illustrate an example of detecting an event 130 in the virtual space 20 relating to the first portion 120 of the virtual space 20. In these examples, the first portion 120 of the virtual space 20 is a boundary, however, the first portion 120 of a virtual space 20 may take a number of different forms. In these examples, the response 122 to the event 130 detection is visual alert, however, response 122 may take a number of different forms.

Referring back to FIG. 8, at block 102, the method 100 enables viewing by the user 18 of a virtual scene 22 of a virtual space 20. In a virtual reality implementation, the virtual scene 22 comprises a plurality of artificial virtual objects 28 (see FIG. 1B). The virtual scene 22 may, for example, be provided by recorded video of a real space 10 or may be computer generated.

In an augmented reality implementation, the virtual scene 22 of the virtual space 20 comprises a plurality of virtual objects 21. The virtual scene 22 consists of a real scene 12 of real objects 11 in real space 10 in real time augmented by or augmentable by one or more artificial virtual objects 28 (see FIGS. 3B and 2A). As previously described, the augmented reality implementation may be provided by a see-through arrangement or a see-video arrangement. The virtual scene 22 and the real scene 12 within it are viewed in real life and real time. The user 18 may be local to the real space 10 viewed in the virtual scene 22 and, for example, be performing the three-dimensional gesture 80 in the real space 10 and using a see-through arrangement or a see-video arrangement. Alternatively, the user 18 may be remote from the real space 10 viewed in the virtual scene 22, be performing the three-dimensional gesture 80 in a remote space and be using a see-video arrangement.

At block 104, the method 100 maps a three-dimensional gesture 80 of the user 18 to a corresponding three-dimensional gesture in the virtual space 20. A scaled mapping of the mapping used to map the real space 10 to the virtual space 20 may be used to map the three dimensional user gesture 80 to the corresponding three-dimensional user gesture in virtual space 20. The scaling of the mapping may, for example, be dependent upon a size of the field of view 26 defining the virtual scene 22 so that user gestures are scaled relative to the viewed virtual scene 22. The three-dimensional gesture 80 of the user 18 controls event detection in the virtual space 20.

At block 106, the method 100 determines if the corresponding three-dimensional gesture in the virtual space is a first predetermined gesture or predetermined gestures in relation to a first portion 120 of the virtual space 20.

A first predetermined gesture may be used, for example, to switch-on detection of an event relating to the first portion 130 of the virtual space 20, that has been pre-defined adequately. This pre-definition may, for example, require pre-definition of the first portion 120 of the virtual space 20 and/or pre-definition of the event 130 and/or pre-definition of the response 122.

A plurality of predetermined gestures may be used, for example, to define detection of an event relating to the first portion 120 of the virtual space 20. This definition may, for example, require definition of the first portion 120 of the virtual space 20 and/or definition of the event 130 and/or definition of the response 122.

At block 108, the method 100 analyzes the virtual space 20 over time to detect an event 130 in the virtual space 20 relating to the first portion 120 of the virtual space 20. The analysis of the virtual space 20 may, for example, be spatially limited to only that part of the virtual space 20 that comprises the first portion 120. The analysis of the virtual space 20 may, for example, be limited to only that part of the virtual space 20 that comprises the first portion 120 while it is part of the viewed virtual scene 22. The analysis of the virtual space 20 may, for example, be limited to only that part of the virtual space 20 that comprises the first portion 120 while it is not part of the viewed virtual scene 22. The analysis of the virtual space 20 may, for example, be limited to only that part of the virtual space 20 that comprises the first portion 120 irrespective of what part of the virtual space 20 is viewed in the virtual scene 22. The analysis may, for example, comprise the tracking of virtual object(s) 21 which depending upon implementation may be an artificial virtual object(s) 28 and/or real object(s) 11.

At block 110, the method 100 produces a response 122 to the event 130 detection. The response 122 may, for example, be a real time alert notification to the user 18 or it may be the logging of information. For example, the response may be the provision of a visual, audio alert to the user 18 for example as illustrated in FIG. 14C. In other examples, the response may be to log the event detection. It may, for example, be possible to create a record of event detections and provide this information to the user 18 as, for example, artificial virtual objects 28 in the virtual scene 22 either permanently or in response to a request by the user 18. It may also be possible to index the event in a recorded video stream for example as a time stamp, such that the indexed event can be viewed at a later date. It may also be desirable to spatially and/or temporarily crop a video stream to capture the occurrence of the event 130. Spatial cropping may be particularly advantageous where a panoramic image of a real space 10 is recorded whereas only a reduced field of view 26 is displayed to the user in the virtual scene 22.

In some, but not necessarily all examples, the user 18 may be able to use the apparatus 30 to specify the response of the apparatus 30 to detection of the event 130.

The method 100 may, in some embodiments, be used to control surveillance of a virtual space 20. The virtual space 20 in an augmented reality implementation, may be a remote or local real space, relative to the user 18, that is surveyed in real time. The virtual space 20 in a virtual reality implementation may be an entirely artificial virtual space or a recorded real space that does or does not comprise artificial virtual objects 28. The detected event 130 may be a surveillance event such as for example a goal in a recorded sports video or a home surveillance activity when the user 18 is away from home.

FIGS. 9 to 13 illustrate how a user may specify the first portion 120 of the virtual space 20 according to blocks 104, 106 of the method 100 that is subsequently used by blocks 108, 110 of the method 100 to detect the event 130 in the virtual space 20 relating to the first portion 120 of the virtual space 20. In these figures, the figures labeled with "A" illustrate the virtual space 20 and the virtual scene 22 defined by a position of the field of view 26 in the virtual space 20 and the figures labeled with "B" illustrate a gesture 80 of a user 18 in a real space 10. In some examples, the real space 10 occupied by the user 18 may also be the real space viewed in the virtual scene 22, for example, in real time. In other examples, the real space 10 occupied by the user 18 may be remote from the real space viewed in the virtual scene 22, for example, in real time. In other examples, the virtual scene 22 may be artificial.

Figure 9A:
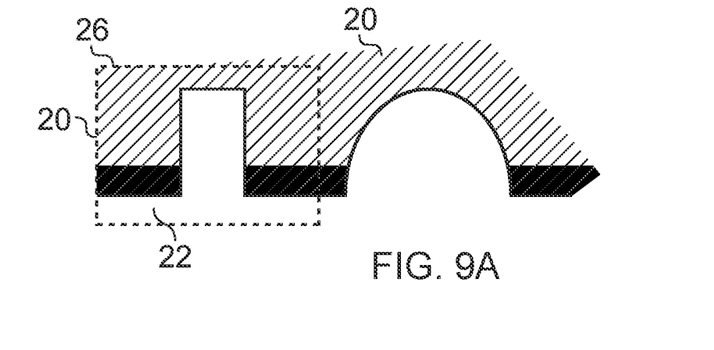
FIGS. 9A, 9B, 10A, 10B, 11A, 11B, 12A, 12B and 13A, 13B illustrate an example of user-specification of a first portion of the virtual space.
Figure 9B:
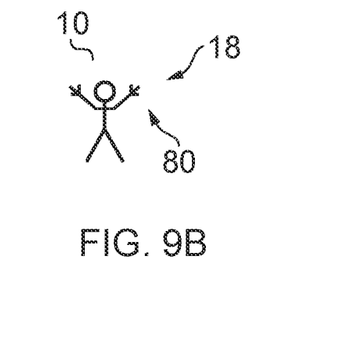

As illustrated in FIGS. 9A and 9B, the user 18 initially performs an initiation gesture 80 as illustrated in FIG. 9B. The apparatus 30 detects and recognizes this gesture 80 and in response initiates the method 100.

The user 18 is able to view the virtual scene 22 via the apparatus 30. The user 18 may by user actions re-position the field of view 26 within the virtual space 20 and thereby redefine the virtual scene 22. However, this should be done before the initiation gesture 80 is performed. Once the initiation gesture is performed, user specification of the first portion 120 in the virtual space 20 is initiated. User specification of the first portion 120 in the virtual space 20 is described with reference to FIGS. 10-13.

Figure 10A:
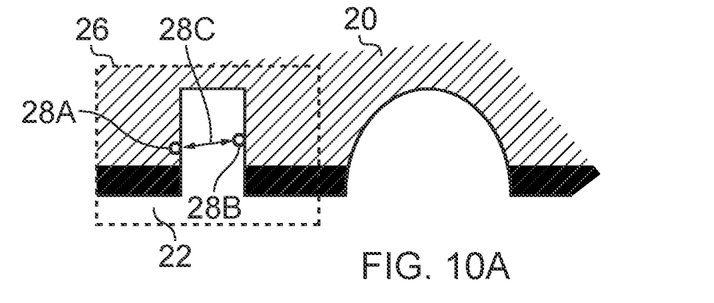
Figure 10B:
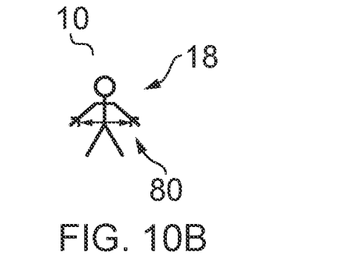

As illustrated in FIG. 10B, the user 18 performs a first gesture 80 to define a first dimension of the first portion 120 of the virtual space 20. In this example, the user 18 holds their arms width wise specifying a horizontal dimension of the first portion 120 by controlling a separation in a horizontal direction of the user's hands. The size of the horizontal dimension of the first portion 120 of the virtual space 20 is dependent upon the actual horizontal separation of the hands of the user 18 performing the first gesture 80. In response, the apparatus 30 may control the display 32 to display in the virtual scene 22 artificial virtual objects 28A, 28B, 28C that represent a position and the horizontal dimension of the first portion of 120. The artificial virtual objects 28A, 28B may be at positions in the virtual space 20 corresponding to positions of the user's hands when mapped from the user's space to the virtual space 20 and the artificial virtual object 28C may be positioned and sized in the virtual space 20 so that it corresponds to the horizontal separation between the user's hands when mapped from the user's space to the virtual space 20.

In some but not necessarily all examples, the user 18 may then re-size the horizontal dimension of the first portion 120 of the virtual space 20 by, for example, changing the horizontal separation of their hands by bringing their hands closer together or further apart. In some but not necessarily all examples, the user 18 may re-position the horizontal dimension of the first portion 120 of the virtual space 20 by, for example, changing the direction in which the user 18 is facing by, for example, rotating their torso. When the user 18 is satisfied that the first dimension of the first portion 120 of the virtual space 20 has been properly positioned and sized, the user 18 may perform a second gesture 80 that indicates that the first gesture 80 has finished.

Figure 11A:
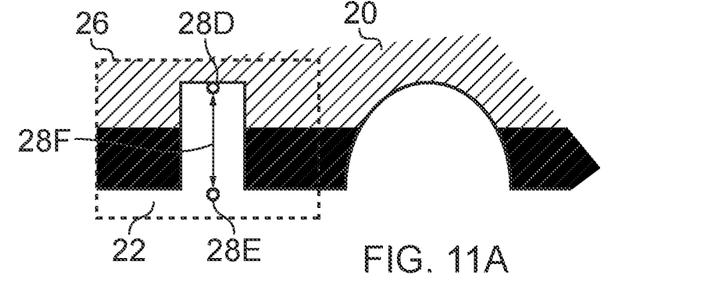
Figure 11B:
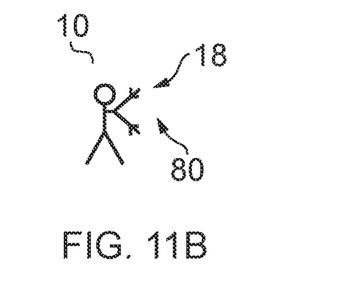

Next illustrated in FIG. 11B, the user 18 performs a third gesture 80 to define a second dimension of the first portion 120 of the virtual space 20. In this example, the user 18 holds their arms height wise specifying a vertical dimension of the first portion 120 by controlling a separation in a vertical direction of the user's hands. The size of the vertical dimension of the first portion 120 of the virtual space 20 is dependent upon the actual vertical separation of the hands of the user 18 performing the third gesture 80. In response, the apparatus 30 may control the display 32 to display in the virtual scene 22 artificial virtual objects 28D, 28E, 28F that represent a position and the vertical dimension of the first portion of 120. The artificial virtual objects 28D, 28E may be at positions in the virtual space 20 corresponding to positions of the user's hands when mapped from the user's space to the virtual space 20 and the artificial virtual object 28F may be positioned and sized in the virtual space 20 so that it corresponds to the vertical separation between the user's hands when mapped from the user's space to the virtual space 20.

In some but not necessarily all examples, the user 18 may then re-size the vertical dimension of the first portion 120 of the virtual space 20 by, for example, changing the vertical separation of their hands by bringing their hands closer together or further apart. In some but not necessarily all examples, the user 18 may re-position the vertical dimension of the first portion 120 of the virtual space 20 by, for example, changing the direction in which the user 18 is facing by, for example, rotating their torso. When the user 18 is satisfied that the second dimension of the first portion 120 of the virtual space 20 has been properly positioned and sized, the user 18 may perform a fourth gesture 80 that indicates that the third gesture 80 has finished.

As illustrated in FIG. 12B, the user 18 may then perform further gestures 80 to change the position and/or orientation of the first portion 120 of the virtual space 20. In this example, the first portion 120 of the virtual space 20 is indicated in the virtual scene 22 by displaying an artificial virtual object 28G. In this example the artificial virtual object 28G is a rectangle having a width defined by the first horizontal dimension of the first portion 120 of the virtual space 20 and a height defined by the second vertical dimension of the first portion 120 of the virtual space 20. The user by performing appropriate gestures 80 may be able to move the first portion 120 in the virtual space 20 as indicated by the virtual object 28G in any of three translational degrees of freedom, that is forward/back, left/right and up/down. The user may also be able to change the orientation of the first portion 120 of the virtual space 20 as indicated by the artificial virtual object 28G in any of three rotational degrees of freedom, each of which may be defined as a rotation about one of the linear degrees of freedom, that is, roll, pitch, yaw respectively.

Once the user 18 is satisfied that the first portion 120 of the virtual space 20 as indicated by the artificial virtual object 28G is satisfactorily sized, positioned and oriented the user may perform a gesture 80, as illustrated in FIG. 13B that accepts the current first portion 120 of the virtual space 20 and enables the method 100 in relation to that first portion 120. In some embodiments, the 'enabled' first portion 120 of the virtual space 20 may be indicated in the virtual scene 22 using an artificial virtual object 28H. The user 18 having now defined and enabled the first portion 120 of the virtual space 20 is able to change the position of the field of view 26 in the virtual space 20 and thus change the virtual scene 22. This has been illustrated in FIG. 14A.

Referring back to FIGS. 12A and 12B, the apparatus 30 may provide additional graphical indicators as artificial virtual objects 28 for positioning the first portion 120 of the virtual space 20 indicated as an artificial virtual object 28G. For example a shadow or shadows may be provided for the artificial virtual object 28G such that its depth within the virtual space 20 can be assessed by the user 18. The graphical indicators therefore assist with positioning of the artificial virtual object 28 within the virtual space 20.

It will be appreciated that in some but not necessarily all examples, the first portion 120 of the virtual space 20 may be considered to be a virtual object 21 that is created, positioned, sized and oriented by the user 18 independently of other virtual objects 21 in the virtual scene 22. However, in other embodiments the position, size and orientation of the first portion 120 of the virtual space 20 may be dependent upon the other virtual objects 21 in the virtual space 20. For example, in some examples it may not be possible to position the first portion 120 in some locations. In some examples it may only be possible to position the first portion 120 of the virtual space 20 in certain locations for example in only certain defined locations relative to virtual objects 21 in the virtual space. It may, in some examples, be advantageous to force the first portion 120 of the virtual space 20 to occupy only a limited number of positions. For example the first portion 120 of the virtual space 20 may be defined automatically in relation to one or more virtual objects by for example snapping the first portion 120 onto or between existing virtual objects 21 in the virtual space 20. The term automatic implies at least partial automation but does not necessarily mean fully or completely automated.

FIGS. 14A, 14B, 14C illustrate an example according to blocks 108, 110 of the method 100.

In FIG. 14A, the first portion 120 of the virtual space 20 has been defined within the virtual space 20 but is no longer within the displayed virtual scene 22. In FIG. 14B, the apparatus 30 is performing block 108 of the method 100. The apparatus 30 is analyzing the virtual space 20 over time to detect an event 130 in the virtual space 20 relating to the first portion 120 of the virtual space 20. In this example, the apparatus 30 tracks a virtual object 21 moving in the virtual space 20 but not necessarily moving within the virtual scene 22. In the example of FIG. 14B, the virtual object 21 has not yet caused a detectable event 130 in the virtual space 20 relating to the first portion 120 of the virtual space 20. However, in FIG. 14C, the virtual object 21 has passed through the first portion 120 of the virtual space 20 causing the event 130 in the virtual space 20 relating to the first portion 120 of the virtual space 20. The apparatus 30, by analyzing the virtual space 20 over time detects this event 130 and, as illustrated in block 110 of the method 100 in FIG. 8, provides a response 122 to the event detection. In this example, the response is an artificial virtual object 28 in the form of an indicator 122 that indicates to the user that an event 130 has been detected and, in addition, gives an indication to the user 18 to where they change their point of view so that the event 130 falls within the virtual scene 22. In the example of FIG. 14C, the response is an indicator arrow to the left displayed as an artificial virtual object 28.

It will therefore be appreciated that the first portion 120 of the virtual space 20 in FIGS. 14A, 14B and 14C provides a two-dimensional boundary that is limited in both height and width. The boundary 124 may or may not be identified using an artificial virtual object 28 when it falls within the field of view 26 defining the virtual scene 22. In the example of FIG. 14C, when the moving virtual object 21 passes through the two-dimensional plane defined by the boundary 124, a detection event 130 occurs.

The moving virtual object 21 that causes the detection event 130 may for example, be a real object 11 that is moving in a real space 10 or it may be an artificial virtual object 21 that does not exist within a real space 10.

The user 18 may be able to specify the identity of the moving object 21 that causes the event 130. It is therefore possible for the user 18 to make the event 130 conditional not only upon an event 130 occurring in relation to the first portion 120 of the virtual space 20 but also conditional upon the nature of the event 130 that occurs.

In the description of FIGS. 8 to 14 reference has been made to the performance of three-dimensional gestures 80. These gestures 80 may be static or they may be moving gestures. They may, for example, involve the movement of the user input object e.g. a user body part or parts or further apparatus. A three-dimensional gesture is a gesture that is performed in three dimensions either via a static pose in three dimensions or by movement through three dimensions. The gesture may be a non-contact gesture that does not contact the apparatus 30. The gesture 80 may be a relative gesture that is defined by relative displacement during the gesture. The gesture 80 may be un-tethered so that it does not need to be performed in a precise location either in absolute space or relative to the apparatus 30.

The methods described in relation to FIGS. 8 to 14 may, for example, be performed by any of the described apparatus 30. As previously described, user input circuitry 44 may be used to detect user actions that determine the point of view 24 within the virtual space 20, changing the virtual scene 22. The apparatus 30 may, for example, be a head-mounted apparatus 33 with either a see-through arrangement for augmented reality or a see-video arrangement. The head-mounted apparatus 33 provides for a first person's perspective mediation for which the user input circuitry 44 detects user's real point of view 14 using user point of view sensor 45. The user's real point of view is used by the controller 42 to determine the point of view 24 within the virtual space 20 changing the virtual scene 22. The real direction 25 may, for example, be changed by the user 18 changing an orientation of their head or viewpoint and/or changing a direction of their gaze.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 may, for example be a module. The apparatus 30 may be a module. The input circuitry may be a module or comprise modules. The display 32 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    displaying to a user a virtual scene of a virtual space;
    mapping a three-dimensional gesture of the user to a corresponding three-dimensional gesture in the virtual space; and
    in response to determining that the corresponding three-dimensional gesture in the virtual space is a first predetermined gesture or predetermined gestures in relation to a first portion of the virtual space, analyzing the virtual space over time to detect an event in the virtual space relating to the first portion of the virtual space, where the detected event comprises an arrival of an object at the first portion of the virtual space, where a three-dimensional position of the first portion comprises an allowable position relative to at least one of:
one or more predetermined positions in the virtual space, or
one or more virtual objects in the virtual space,
where the virtual space further comprises non-allowable positions for the first portion.

2. A method as claimed in claim 1, wherein the first portion of the virtual space is specified through the user using first three-dimensional gestures.

3. A method as claimed in claim 1, wherein the first portion of the virtual space defines a boundary; and
further comprising mapping one or more first three-dimensional gestures of the user to one or more corresponding first three-dimensional gestures in the virtual space and defining at least one dimension of the boundary in response to the one or more first three-dimensional gestures.

4. A method as claimed in claim 1, comprising mapping one or more first three-dimensional gestures of the user to one or more corresponding first three-dimensional gestures in the virtual space to define a change in position and/or orientation of the first portion of the virtual space, wherein the mapping of the three-dimensional gesture of the user to the corresponding three-dimensional gesture in the virtual space is dependent upon a field of view used to define the virtual scene of the virtual space.

5. A method as claimed in claim 1, wherein the first portion of the virtual space is defined automatically in relation to one or more virtual objects.

6. A method as claimed in claim 1, further comprising generating a response in response to the detected event, wherein the response is a real time alert for the user.

7. A method as claimed in claim 1, further comprising generating a response to the detected event, the response comprising logging information.

8. A method as claimed in claim 1, wherein the object comprises a moving virtual object in the virtual space.

9. A method as claimed in claim 1, wherein the first portion of the virtual space is a boundary and the detected event is a crossing event wherein the object comprises a moving virtual object that crosses the boundary.

10. An apparatus comprising at least one processor and at least one non-transitory memory, the non-transitory memory comprising machine-readable instructions, that when executed cause the apparatus to:
display to a user a virtual scene of a virtual space;
map a three-dimensional gesture of the user to a corresponding three-dimensional gesture in the virtual space; and
in response to determining that the corresponding three-dimensional gesture in the virtual space is a first predetermined gesture or predetermined gestures in relation to a first portion of the virtual space, analyze the virtual space over time to detect an event in the virtual space relating to the first portion of the virtual space, where the detected event comprises an arrival of an object at the first portion of the virtual space, where a three-dimensional position of the first portion comprises an allowable position relative to at least one of:
one or more predetermined positions in the virtual space, or
one or more virtual objects in the virtual space,
where the virtual space further comprises non-allowable positions for the first portion.

11. An apparatus as claimed in claim 10, wherein the first portion of the virtual space is specified through the user using first three-dimensional gestures.

12. An apparatus as claimed in claim 10, wherein the first portion of the virtual space defines a boundary; and
wherein the apparatus is further caused to map one or more first three-dimensional gestures of the user to one or more corresponding first three-dimensional gestures in the virtual space and defining at least one dimension of the boundary in response to the one or more first three-dimensional gestures.

13. An apparatus as claimed in claim 10, further caused to map one or more first three-dimensional gestures of the user to one or more corresponding first three-dimensional gestures in the virtual space to define a change in position and/or orientation of the first portion of the virtual space, wherein the mapping of the three-dimensional gesture of the user to the corresponding three-dimensional gesture in the virtual space is dependent upon a field of view used to define the virtual scene of the virtual space.

14. An apparatus as claimed in claim 10, wherein the first portion is displayed in the virtual scene with at least one indicator for positioning.

15. An apparatus as claimed in claim 10, wherein the first portion of the virtual space is defined automatically in relation to one or more virtual objects.

16. An apparatus as claimed in claim 10, further caused to generate a response in response to the detected event, wherein the response is a real time alert for the user.

17. An apparatus as claimed in claim 16, wherein the response to the detected event is specified through the user.

18. An apparatus as claimed in claim 10, further caused to generate a response to the detected event, the response comprising logging information.

19. An apparatus as claimed in claim 10, wherein the object comprises a moving virtual object in the virtual space.

20. An apparatus as claimed in claim 10, wherein the first portion of the virtual space is a boundary and the detected event is a crossing event wherein the object comprises a moving virtual object that crosses the boundary.

* * * * *